United States Patent [19]

Steinberger et al.

[11] Patent Number: 4,562,223

[45] Date of Patent: Dec. 31, 1985

[54] DEFOAMING AGENT FOR PLASTIC DISPERSIONS AND DISPERSE COATING MATERIALS AND ITS PREPARATION

[75] Inventors: Helmut Steinberger; Werner Clarenz, both of Leverkusen, Fed. Rep. of Germany

[73] Assignee: Bayer Aktiengesellschaft, Leverkusen, Fed. Rep. of Germany

[21] Appl. No.: 520,089

[22] Filed: Aug. 4, 1983

Related U.S. Application Data

[63] Continuation of Ser. No. 305,652, Sep. 25, 1981, abandoned.

[30] Foreign Application Priority Data

Oct. 15, 1980 [DE] Fed. Rep. of Germany ....... 3038982

[51] Int. Cl.$^4$ ............................................. C08L 83/04
[52] U.S. Cl. .................................... 524/506; 524/266; 524/492
[58] Field of Search ............... 524/506, 505, 501, 500, 524/265, 266, 588, 492, 493

[56] References Cited

U.S. PATENT DOCUMENTS

| | | | |
|---|---|---|---|
| 3,255,141 | 6/1966 | Damm | 260/29.6 |
| 3,308,080 | 3/1967 | Haenni | 260/29.1 |
| 3,457,173 | 7/1969 | Pater | 252/46.3 |
| 4,250,071 | 2/1981 | Perry | 260/29.7 |
| 4,274,883 | 6/1981 | Lumbeck | 106/308 |

*Primary Examiner*—Paul R. Michl
*Attorney, Agent, or Firm*—Sprung Horn Kramer & Woods

[57] ABSTRACT

A dispersion comprising a solvent having dispersed therein a plastic and a defoaming agent comprising by weight approximately (a) 80 to 100% by weight of a polyoxyalkylenesiloxane copolymer of the formula

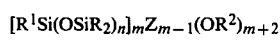

in which
R represents an optionally halogen-substituted alkyl group with up to 4 C atoms,
$R^1$ represents the substituent R or a phenyl radical,
$R^2$ represents a group of the composition

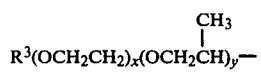

Z represents the difunctional unit —O— or

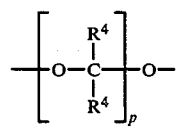

and
$R^3$ denotes a hydrocarbon radical with up to 6 C atoms,
$R^4$ denotes independently of one another hydrogen or $R^3$,
n denotes a number between 3 and 40,
m denotes a number between 1 and 15,
x denotes a number between 0 and 68,
y denotes a number between 0 and 52,
x+y denotes a number between 1 and 68 and (b) 0–20% by weight of a hydrophobic silicon dioxide, whereby substantially bubble-free films can readily be prepared therefrom.

3 Claims, No Drawings

DEFOAMING AGENT FOR PLASTIC DISPERSIONS AND DISPERSE COATING MATERIALS AND ITS PREPARATION

This is a continuation of application Ser. No. 305,652, filed 9-25-1981, abandoned.

The invention relates to a defoaming agent which consists essentially of about (a) 80 to 100% by weight of a polyoxyalkylene-siloxane copolymer of the general formula:

$$[R^1Si(OSiR_2)_n]_m Z_{m-1}(OR^2)_{m+2},$$

in which
R represents an optionally halogen-substituted alkyl group with up to 4 C atoms,
$R^1$ represents the substituent R or a phenyl radical,
$R^2$ represents a group of the composition $$R^3(OCH_2CH_2)_x(OCH_2\overset{CH_3}{\underset{|}{CH}})_y-$$

and
Z represents the difunctional unit —O— or $$\left[-O-\overset{R^4}{\underset{\underset{R^4}{|}}{C}}-O-\right]_p$$

and
$R^3$ denotes a hydrocarbon radical with up to 6 C atoms,
$R^4$ denotes independently of one another hydrogen or $R^3$,
n denotes a number between 3 and 40,
m denotes a number between 1 and 15,
x denotes a number between 0 and 68,
y denotes a number between 0 and 52,
x+y denotes a number between 1 and 68 and
p denotes a number between 2 and 12, and
(b) 0–20% by weight of a hydrophobic silicon dioxide.

The subject of the present invention is, in addition, a process for the preparation of the defoaming agents, which is characterized in that an organopolysiloxane of the general formula $$R^1Si(OSiR_2)_nU_{3-a-b}Cl_aW_b,$$

in which
U represents a radical of a low monobasic carboxylic acid with up to 4 C atoms, preferably an acetate radical, and
W represents a radical of a fluorinated alkanesulphonic acid, and
a is equal to or less than 1 and
b is equal to or less than 0.5,
and which is obtained by reaction of $R^1SiCl_3$ with a diorganopolysiloxane in the presence of fluorinated alkanesulphonic acid or salts thereof in excess monobasic carboxylic acid, is reacted with a mixture of $R^2OH$ and H—Z—H, the composition of which is determined by the chain length n of the organopolysiloxane member, in the presence of a base in an organic solvent, and is optionally mixed with 20 to 0% by weight of a hydrophobic silicon dioxide.

Defoaming agents are an essential constituent in the processing of plastic dispersions, such as, for example, butadiene, styrene, acrylate, polyvinylpyrrolidone and polyvinyl acetate dispersions, or dispersions of their copolymers with one another. While handling the dispersions, for example in stirring, pumping, grinding on dissolvers, bead mills or other aggregates, in working with painters brushes, spraying or in pouring, the incorporation of air bubbles can often not be avoided.

Particularly in the case of relatively high viscosities of the coating materials (<100 mPa.s), more foam is produced during the processing than can disintegrate in the same period. Delays in the course of production or processing and defective surfaces in the coating processes result therefrom, if foam bubbles are still present in the coating material after the coating agent has been processed.

To overcome these disadvantages, the addition of various defoaming agents has been tested.

Commercially customary silicone defoaming agents are considered to be particularly rapidly effective, but the amounts that need to be added for defoaming frequently cause craters, irregularities and disturbances in flow in the coated surfaces.

Defoaming agents based on mineral oil do not act rapidly enough to obtain coatings free of bubbles on drying of the lacquer.

This deficiency is eliminated by the defoaming agents according to the invention. They have outstanding defoaming action for coating materials based on dispersions, without disadvantageously affecting the flow or the properties of the surface.

The polyoxyalkylene-polysiloxane copolymers required for the preparation of the defoaming agents are materials which are in themselves known. Their preparation is effected by reaction of polyether-ols with silicon-functional siloxanes. For this purpose, for example, polyether-ols are reacted in stoichiometric ratio, in the presence of an acid-trapping agent, with linear or branched equilibrated acyloxy-containing organopolysiloxanes, the preparation of which is described in DT OS (German Published Specification) No. 2,802,668.

For the preparation of defoaming agents for disperse coating materials it is important exactly to observe the stoichiometry between the hydroxy-functional polyether-ol groups and the quantity of acyloxy groups of the organopolysiloxanes.

A stoichiometric excess of the polyether portion can have an unfavorable effect on the activity of the defoaming agent. The presence of siloxane portions which are chemically not bonded to polyether molecules can cause the formation of craters in the lacquer films prepared with these siloxanes.

The proportion of the polyether-siloxane copolymers in the defoaming preparation according to the invention can amount to 80 to 100% by weight of the total agent, but it is preferably present in a quantity of about 90 to 94%.

In the claimed siloxane-polyoxyalkylene copolymers of the general formula $$[R^1Si(OSiR_2)_n]_m Z_{m-1}(OR^2)_{m+2},$$

the number of dimethylsiloxane units, as defined by n and m, can range from 6 to 40, n being between 2 to 50 and m ranging from 3 to 9.

Siloxane-polyoxyalkylene copolymers of the structure given above, in which n is between 6 and 20 and m is 2 or 3, are particularly preferred for the defoaming of plastic dispersions.

The polyether portion, designated by the grouping $OR^2$, of the siloxane-polyoxyalkylene copolymers preferably consists of structures of the formula

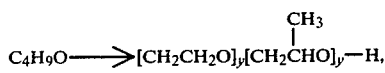

in which
the value x varies between 8 and 40 and
the value for y is preferably between 6 and 30.

The methyl, chloromethyl, ethyl and propyl radicals are examples of the groups R, and $R^3$ and preferably an $OC_4H_9$ radical, although $CH_3O—$, $C_2H_5O—$, $C_3H_7O—$ or $C_3H_5O—$ radicals are likewise possible.

Examples of the compound H—Z—H are $H_2O$, $HO—CH_2CH_2—OH$,

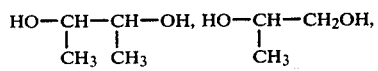

$HO—CH_2—CH_2—CH_2—OH$,

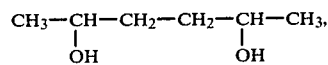

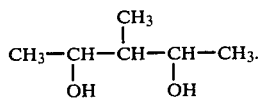

Compounds with secondary OH groups are particularly suitable.

The process according to the invention is carried out, in general, in such a manner that the polyorganosiloxane is mixed with a solvent, preferably with toluene or xylene, and is then rapidly stirred with a mixture of $R^2OH$, H—Z—H and toluene. Approximately the stoichiometric quantity of $NH_3$ is introduced into this mixture at room temperature. An excess of $NH_3$ is then introduced into the mixture, and the latter is stirred for approximately 1 hour at approximately 70° C.

After the mixture has cooled, the precipitated salt is filtered off and the solvent is removed at about 100° C. in vacuo. These preferred reaction conditions can, however, be adapted to the particular requirements, and thus deviate from the conditions mentioned here, in a manner known to the expert.

The yellowish colored, clear solutions produced have, according to composition, a viscosity between 300 and 3,500 mPa.s.

The siloxane-polyoxyalkylene copolymers thus prepared are suitable for the preparation of defoaming agents for plastic dispersions and disperse coating materials.

Furthermore, a hydrophobic silicon dioxide is advantageous for the preparation of the defoaming agents according to the invention.

A hydrophobic silicon dioxide is a silicon dioxide in which the hydroxyl groups positioned at the surface have been eliminated by reaction with an organofunctional silicone compound. Trimethylchlorosilane, dimethyldichlorosilane, hexamethyldisiloxane, hexamethyldisilazane or trimethylmethoxysilane can be used, for example, for the reaction of hydroxyl groups. The reaction of the silicon dioxide with the organofunctional silicone compound makes the silicon dioxide hydrophobic in comparison to its original hydrophilic character.

The BET-surface of the hydrophobic silicic acids can be between 50 to 300 $m^2/g$. Optimum results are achieved if the surface is between 80 to 140 $m^2/g$.

To achieve the effects, it is not absolutely necessary to add the hydrophobic silicon dioxide to the defoaming agent preparation. However, the quantity for use which is necessary for rapid defoaming is greatly reduced in many cases, without disadvantageous properties arising through the addition.

The addition of the hydrophobic silicon dioxide to the siloxane-polyoxyalkylene copolymers can be effected in mixing aggregates, kneaders or ball mills, or by stirring it in with dissolver discs.

It is advantageous to warm the mixture after the silicon dioxide has been introduced, and the heating temperature can be between 90° and 150° C., preferably between 110° and 130° C. The duration of the heating operation is between 30 minutes and 4 hours, and 60 to 90 minutes are preferred.

The examples which follow are intended to illustrate the invention in more detail, without limiting it in its scope.

Percent data denote percent by weight, if not specifically otherwise indicated.

Acetoxy polysiloxanes prepared according to DE-OS (German Published Specification ) No. 2,802,668

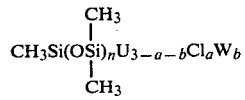

in which
a+b denotes 0.5 and
W denotes a $C_4F_9SO_3$ radical, and polyethers started from butanol, which contain ethylene oxide and propylene oxide units in alternating sequence:

have been used for the preparation of the polyether-siloxane copolymers.

A siloxane product with the theoretical composition

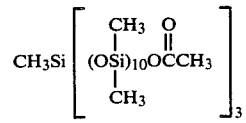

is prepared, for example, as follows: 18 g (0.3 mol) of perfluorobutanesulphonic acid and then 3,996 g (13.5 mols) of octamethylcyclotetrasiloxane are added to 299 g (2 mols) of methyltrichorosilane. The mixture is then heated to 90° C. and 800 g (134 mols) of acetic acid are added to it in the course of 2 hours. During the addition, the mixture is further heated to a higher temperature, so that after the addition is completed (HCl flow exhausted) the temperature of 130° C. is reached. The mixture is then stirred for 2 hours at 130° C.

Heating is completed at 130° C. and 67 mbars.
Yield: 4,000 g
Acetate: 137 milligram-equivalents/100 g.

EXAMPLE 1

Preparation of Defoaming Agent 500 g [≃1.02 gram-equivalents of acetate] of an acetoxypolysiloxane with n=16.9 dimethylsiloxy units are stirred with 2,000 g of dried toluene. A mixture, which consists of 1,447.3 g [0.79 gram-equivalent] of polyether [with a molar weight MW=1870 and an ethylene oxide content of 45% and a propylene oxide content of 55%], 10.35 g [0.23 gram-equivalent] of butane-2,3-diol and 1,500 g of dried toluene, is added to the above-mentioned mixture at room temperature in the course of 15 minutes. 17.34 g of dried $NH_3$ are introduced into the mixture (at approximately 8.67 g/h) in the course of 2 hours, without heating, until saturation is reached. The mixture is then heated to 70° C. in the course of 30 minutes, and the flow of ammonia is increased to 11.79 g/h. The mixture is further stirred for 90 minutes and is then slowly cooled. The $NH_3$ flow is stopped 30 minutes after the beginning of the cooling phase.

The solution, which is very clouded by the salt, is filtered, and the solvent is expelled from the filtrate by heating at 100° C. maximum and 20 mbars. A clear, slightly yellow colored residue is obtained.

Yield: 1,978.5 g $\eta$: 640 mPa.s $n_D^{20} = 1.4475$

Preparation of the Defoaming Agent 1860 g of the polyether siloxane copolymer obtained according to the above method are introduced together with 40 g of a hydrophobic, precipitated silicic acid having a BET surface area of 100 $m^2/g$ into a 3 liter capacity ball mill, which has additionally been provided with 25 porcelain balls each having a diameter of 18 mm. The filled ball mill is mechanically rotated for 5 hours at about 50 revolutions per minute and then the contents of the ball mill, which have been separated from the grinding balls, are transferred to a heatable container which has a stirrer and which is able to be evacuated. While applying a vacuum of 52 mbar the mixture is heated for 3 hours at 110° C. A cloudy, viscous liquid is obtained.

EXAMPLE 2

Preparation of Defoaming Agent 11.0 kg [15.07 gram-equivalents of acetate] of an acetoxypolysiloxane with an index of 30 is stirred with 16.8 kg of dried toluene, and a mixture of 23.17 kg of a polyether [with a molar weight of 2304 and an ethylene oxide content of 41.5% and a propylene oxide content of 58.5%] and 28 kg of toluene is added to it in the course of 15 minutes. 304 g of $NH_3$ are then introduced into the mixture during the course of approximately 45 minutes, and the mixture is then warmed to 80° C. When this temperature is reached, 0.644 kg of isopropanol is allowed to run into the mixture, and the latter is stirred for a further 2 hours at 80° C. During this time, an $NH_3$ flow of approximately 195 l/h is introduced into the mixture. The reaction mixture is thereafter cooled to room temperature.

The solution, which is very clouded by the salt, is filtered, and the solvent is distilled off from the filtrate at 100° C. maximum and 50 mbars.

The residue is clear and slightly yellowish.

Yield: 33.4 kg $\eta$: 1560 mPa.s $n_D^{20}$: 1.439.

Preparation of the Defoaming Agent 18.4 kg of the polyether siloxane obtained according to the above method are stirred with a dissolver of commercially customary construction at 400 r.p.m. and 0.6 kg of a hydrophobic, precipitated silicic acid having a BET surface area of 130 $m^2/g$ are stirred in gradually in the course of 1.5 hours at room temperature. The mixture is transferred to a heatable vessel which is able to be evacuated and while applying a vacuum of 52 mbar the mixture is heated for 3 hours at 110° C. A cloudy, viscous liquid is obtained.

EXAMPLE 3

Use of the Defoaming Agent

White lacquer 1

223 g of titanium dioxide (rutile type), 37 g of water, 3 g of a commercially customary pigment wetting agent based on a polyacrylate salt (40% strength in water, for example Dispex G 40 ®; commercial product of Allied Colloids Mfg. Co. Ltd., Bradford/England), 3 g of the defoaming agent according to the invention, of Example 2 and 6.1 g of a commercially customary thickening agent, based on a polyether urethane (10% strength in water, for example Borchigel L 75 ®, commercial product of Gebr. Borchers, Düsseldorf) are dispersed with a dissolver (peripheral velocity of the dissolver disc=20 m/s) to give a viscous pigment paste. After the grinding of the pigment paste has been completed, a mixture of 592 g of a commercially customary copolymerizate dispersion based on acrylate monomers (46.5% strength), 20 g of water, 31 g of butylenediglycol and 30 g of ethylglycol is added to the pigment paste, while stirring slowly. To improve the wetting of the pigment, the lacquer is then additionally ground on a bead mill.

After the lacquer has been ground, it is almost free of foam, and a change in volume cannot be detected.

After 1 hour, the lacquer is spread on a glass plate with a coating roller system (60 mm slit width, 120 μm slit height, coating roller system of Messrs. Pausch, 5657 Haan) and is dried for 4 hours in the standard atmosphere 23/50-DIN 50,014. The surface appears smooth and free of disturbances. On inspection of the coating, only isolated "pin pricks" from air bubbles can be detected. After storage for one week, the lacquer is painted on a degreased aluminum plate (50×50 cm) with a flat brush (width 5 cm). The lacquer surface is free from craters and without bubbles.

EXAMPLE 4

(Comparison Example with a Commercially Customary Silicon Defoaming Agent)

White lacquer 2 is prepared in the same manner as white lacquer 1, but the defoaming agent according to the invention is replaced by 2 g of a commercially customary defoaming agent for disperse lacquers (100% strength, based on organically modified polysiloxanes). After the lacquer has been ground, it is almost free of foam, and a change in volume cannot be detected. After 1 hour, the lacquer is spread on a glass plate with a coating roller system (60 mm slit width, 120 μm slit height, coating roller system of Messrs. Busch, 5657 Haan) and is dried for 4 hours in the standard atmosphere 23/50-DIN 50,014. The surface is free of foam, but is disturbed by numerous craters. After storage for one week, the lacquer is painted on a degreased aluminum plate (50×50 cm) with a flat brush (width 5 cm).

The lacquer surface is free of bubbles, but is covered with numerous craters.

EXAMPLE 5

(Comparison Example with a Commercially Customary Defoaming Agent Based On Mineral Oil)

White lacquer 3 is prepared in the same manner as white lacquer 1, but the defoaming agent according to the invention is replaced by 5 g of a commercially customary defoaming agent for disperse lacquers, which is based on an oxethylated soya oil and alkaline earth metal stearates, approximately 8% in mineral oil/petroleum (80:10).

After it has been ground, the lacquer is foamy, and an increase in the volume is clearly detectable. After 1 hour, because of the foam, the lacquer still cannot be spread on a glass surface with a coating roller system.

After storing for one week, the lacquer is free of foam. On painting it on a degreased aluminum plate with a flat brush (width 5 cm), a surface is obtained which is free of craters but strewn with numerous foam bubbles.

It will be appreciated that the instant specification and examples are set forth by way of illustration and not limitation, and that various modifications and changes may be made without departing from the spirit and scope of the present invention.

We claim:

1. In a dispersion comprising a solvent, a plastic, a defoaming agent, a pigment, a pigment wetting agent and a thickening agent, the improvement which comprises employing as said defoaming agent
    (a) 80 to 100% by weight of polyoxyalkylenesiloxane copolymer of the formula:

$$[R^1Si(OSiR_2)_n]_m Z_{m-1}(OR^2)_{m+2},$$

in which
R represents an optionally halogen-substituted alkyl group with up to 4 C atoms,
$R^1$ represents the substituted R or a phenyl radical,
$R^2$ represents a group of the composition $$R^3(OCH_2CH_2)_x(OCH_2\overset{\underset{\displaystyle CH_3}{|}}{CH})_y-$$

Z represents the difunctional unit —O— or $$\left[ -O-\overset{\underset{\displaystyle R^4}{|}}{\underset{\underset{\displaystyle R^4}{|}}{C}}-O- \right]_p$$

and
$R^3$ denotes a hydrocarbon radical with up to 6 C atoms,
$R^4$ denotes independently of one another hydrogen or $R^3$,
n denotes a number between 3 and 40,
m denotes a number between 1 and 15,
x denotes a number between 0 and 68,
y denotes a number between 0 and 52,
x+y denotes a number between 1 and 68 and
p denotes a number between 2 and 12, and
    (b) 6 to 10% by weight of a hydrophobic silicon dioxide,
and employing an acrylate polymer as the plastic.

2. In the coating of a substrate with a plastic by applying the substrate a dispersion comprising a solvent, a plastic, a defoaming agent and a thickening agent, and allowing the applied dispersion to dry, the improvement which comprises employing as said defoaming agent $$[R^1Si(OSiR_2)_n]_m Z_{m-1}(OR^2)_{m+2},$$

in which
R represents an optionally halogen-substituted alkyl group with up to 4 C atoms,
$R^1$ represents the substituted R or a phenyl radical,
$R^2$ represents a group of the composition $$R^3(OCH_2CH_2)_x(OCH_2\overset{\underset{\displaystyle CH_3}{|}}{CH})_y-$$

Z represents the difunctional unit —O— or $$\left[ -O-\overset{\underset{\displaystyle R^4}{|}}{\underset{\underset{\displaystyle R^4}{|}}{C}}-O- \right]_p$$

and
$R^3$ denotes a hydrocarbon radical with up to 6 C atoms,
$R^4$ denotes independently of one another hydrogen or $R^3$,
n denotes a number between 3 and 40,
m denotes a number between 1 and 15,
x denotes a number between 0 and 68,
y denotes a number between 0 and 52,
x+y denotes a number between 1 and 68 and
p denotes a number between 2 and 12, and
    (b) 0–20% by weight of a hydrophobic silicon dioxide,
and employing an acrylate polymer as the plastic, whereby the coating upon drying is substantially bubble-free.

3. A process according to claim 2, wherein the hydrophobic silicon dioxide is present in about 6 to 10% by weight of the defoaming agent.

* * * * *